Dec. 12, 1972   F. H. McPHERSON ET AL   3,706,074
DATA RECORDER

Filed Oct. 16, 1970   7 Sheets-Sheet 1

Fig. 1.

FRANK H. McPHERSON
IRVIN S. LOWNES
THOMAS L. RICHARDSON

BY
ATTORNEYS

Fig. 2.

Dec. 12, 1972    F. H. McPHERSON ET AL    3,706,074
DATA RECORDER
Filed Oct. 16, 1970    7 Sheets-Sheet 3

INVENTORS
FRANK H. McPHERSON
IRVIN S. LOWNES Jr.
THOMAS L. RICHARDSON
BY Symmestwolt & Lechner
ATTORNEYS Dec. 12, 1972   F. H. McPHERSON ET AL   3,706,074
DATA RECORDER
Filed Oct. 16, 1970   7 Sheets-Sheet 5

| Date | Store | Route | Code |
|---|---|---|---|
| / / | | | |

| Item | Quantity | Description |
|---|---|---|
| 1 | | White Bread, regular loaf |
| 2 | | White Bread, long loaf |
| 3 | | Sandwich Bread, regular |
| 4 | | Sandwich Bread, long |
| 5 | | Round Loaf, regular |
| 6 | | Round Loaf, long |
| 7 | | Rye Bread |
| 8 | | Whole Wheat Bread |
| 9 | | Hamburger Rolls, 12 |
| 10 | | Hamburger Rolls, 8 |
| 11 | | Hot-Dog Rolls, 12 |
| 12 | | Hot-Dog Rolls, 8 |
| 13 | | Donuts |
| 14 | | Pound Cake, small |
| 15 | | Pound Cake, large |
| 16 | | Lemon Ring |
| 17 | | Coffee Cake |
| 18 | | Breakfast Cake |
| 19 | | Jelly Roll |
| 20 | | Sugar Cookies |
| 21 | | |
| 22 | | |
| 23 | | |
| 24 | | |
| 25 | | |
| 26 | | |
| 27 | | |
| 28 | | |
| 29 | | |
| 30 | | |

INVENTORS
FRANK H. McPherson
IRVIN S. LOWNES Jr.
THOMAS L. RICHARDSON
BY Synnestvedt & Lechner
ATTORNEYS

Fig. 4-C.
Detail Card Layout 192

| Date | Store | Route | Item | Quantity | Cost | Unused | Code |
|---|---|---|---|---|---|---|---|
| 1 2 3 4 5 6 | 7 8 9 10 11 12 | 13 14 15 | 16 17 18 | 19 20 21 | 22 23 24 25 26 27 | 28 29 30 31 | 32 |

| Description |
|---|
| 33 34 35 36 37 38 39 40 41 42 43 44 45 46 47 48 49 50 51 52 53 54 55 56 57 58 59 60 61 62 63 64 |

| Price | Price Extension | Cost Extension | Unused |
|---|---|---|---|
| 65 66 67 68 69 70 71 72 | 73 74 75 76 77 78 79 80 81 | 82 83 84 85 86 87 88 89 90 | 91 92 93 94 95 96 |

Fig. 4D.
Master File Card Layout 194

| Unused | Item | Unused | Cost | Unused | Code |
|---|---|---|---|---|---|
| 1 2 3 4 5 6 7 8 9 10 11 12 13 14 15 | 16 17 18 | 19 20 21 | 22 23 24 25 26 27 | 28 29 30 31 | 32 |

| Description |
|---|
| 33 34 35 36 37 38 39 40 41 42 43 44 45 46 47 48 49 50 51 52 53 54 55 56 57 58 59 60 61 62 63 64 |

| Price 1 | Price 2 | Price 3 | Price 4 |
|---|---|---|---|
| 65 66 67 68 69 70 71 72 | 73 74 75 76 77 78 79 80 | 81 82 83 84 85 86 87 88 | 89 90 91 92 93 94 95 96 |

INVENTORS
FRANK H. McPherson
IRVIN S. LOWNES Jr.
THOMAS L. RICHARDSON

United States Patent Office 3,706,074
Patented Dec. 12, 1972

3,706,074
DATA RECORDER
Frank H. McPherson, Rosemont, Irvin S. Lownes, Jr., Norristown, and Thomas L. Richardson, Horsham, Pa., assignors to Decision Data Corporation, Warminster, Pa.
Filed Oct. 16, 1970, Ser. No. 81,250
Int. Cl. G06f 7/06, 7/10
U.S. Cl. 340—172.5
9 Claims

ABSTRACT OF THE DISCLOSURE

A data recorder characterized by plurality of input hoppers and output stackers, which together with other design features represent the first key entry card preparation machine fully automated so as to obviate the need for card handling in the performance of the normal operations of a data recorder including card punching and verification.

BACKGROUND OF THE INVENTION

The preparation of raw information for inputting into a computer or other tabulating equipment has always been one of the major bottlenecks in data processing. In this respect, punch card preparation devices have changed little from the time of their introduction for use in conjunction with tabulating equipment and subsequent thereto as support means for computers. Character recognition devices have not yet developed to the point where they can reliably convert printed information of various type founts into machine-readable inputs. Recently, key-to-tape devices have been introduced to alleviate this problem by keying information directly onto tape, thus substituting a magnetic tape as an intermediate media for the punch cards.

The inputting of information directly onto tape has its drawbacks in that no mobile, readable unit record exists after the information has been inputted into the system. Thus, key-to-tape devices and similarly key-to-disk devices do not necessarily operate to the advantage of the user in eliminating the punch card. In fact, certain advantages are derived when information is stored in a punch card, in that the latter constitutes a mobile, readable unit record. In addition, the card is available to be used over and over for inputting information into a computer or tabulating equipment. A single card frequently can store all the information required about a particular item and, as such, constitutes a unit record. The use of punch cards further enables the information to be conveniently grouped.

SUMMARY OF THE INVENTION

The difficulty with the punch card does not concern the media per se. Nor does the difficulty concern the operations required to input information into the punch card inasmuch as the steps are generally the same whether the information is being keyed into cards or onto tape. In addition, the processing speed of the keypunch operator does not differ significantly whether the information is being keyed into cards or onto tape.

It has long been recognized that an efficient key-punch operator acts in a mechanical fashion until such time as her rhythm is interrupted by the necessity to manually intervene in the card preparation process. Thus, the insertion or removal of a card, or a change in a program control card may drastically alter the productivity of the keypunch operator. The elimination of such manual interruptions constitutes the basis of design of the present invention. Thus, the card preparation equipment of the present invention is designed to operate as a key entry machine which eliminates all handling of cards during the normal operation thereof.

Accordingly, the primary object of the present invention is the maximization of the card preparation capability by minimizing the human intervention required in the preparation of punch cards.

Specific design features and innovations of the present invention facilitate automatic processing by eliminating all handling of cards during the normal operation of the data recorder. In this respect, during the card preparation phase of operation it is possible to automatically locate a particular card in a master file by performing a search for a key entered into memory or from a specified number of cards read into the system. Cards comprising the master file to be searched are fed into the system from a first source. Once a card is found whose informational content matches that of the key entered into memory, the contents of that card are read into memory and selected portions thereof are transferred to a punch station for entry into a blank card. Additional information may be entered into memory via the keyboard to supplement that being transferred from the card located as a result of the key search. When the transcription process is complete for a card, a blank card is fed from a second source and punched accordingly. The newly punched cards are accumulated in one of the plurality of output stackers comprising the data preparation device, while the master cards are collected in another output stacker.

Accordingly, it is another more specific object of the present invention to provide a key field search and update capability in a data preparation device, whereby selected portions of the data contents of punched cards comprising a master file are automatically transferred to a punch station for entry into a corresponding number of blank cards; the selection of cards from the master file being effected automatically as a result of a favorable comparison between a search key and the same information in the punch cards.

Another feature which enhances the operational capabilities of the subject data recorder concerns the ability to selectively transfer information from one field of a master card to another field of a card being prepared. The latter operation is known as the field select feature.

Accordingly, yet another object of the present invention is to provide a data preparation device capable of entering information into selected fields of a card being prepared, from a different field of a previously punched card.

Another feature which facilitates the operating capabilities of the subject data recorder is an auto-verify operation, whereby the system automatically performs the card handling functions in the execution of a conventional verify operation. The verify operation usually follows the preparation of new cards. In this operation the keyboard operator working with a source document, the informational contents of which were used to create the cards being verified, reenters the informational content of the source document into memory for comparison with the informational content of previously punched cards. If during the course of the vertification operation, the keypunch operator detects an error in the informational content of a card being verified, a blank card will be advanced to the punch station to receive a corrected version of the informational content of the card found to be in error. In the card preparation device of the present invention no manual intervention by the keypunch operator is required to insert the blank card and eject the card found to be in error.

Accordingly, still another object of the present invention is the provision of means for automatically inserting a blank card into the system and for entering a corrected version of information therein if, during the course of a verify operation, an error is detected in the informational content of a previously punched card.

Other features of the present invention which facilitate the operation of the subject data recorder will be apparent from the description and explanation of operation of the subject system which follows.

DESCRIPTION OF THE INVENTION

Figure 1:
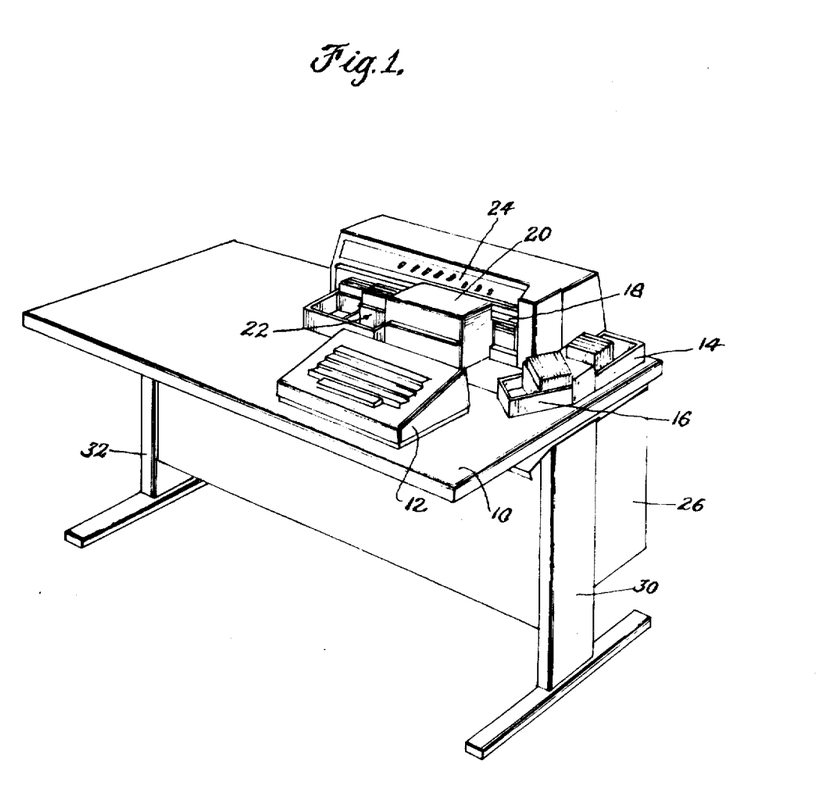
FIG. 1 represents a perspective view of a data preparation device constructed in accordance with the principles of the present invention.

Referring now to the drawings for a more detailed description of the invention, FIG. 1 represents in perspective view the preferred embodiments of a data preparation device constructed in accordance with this invention. This data preparation device, or data recorder as hereinafter referred to, consists of a desk top 10 upon which is mounted a keyboard 12, the latter being of conventional design and preferably implemented with electronic encoding means. Also, mounted on the desk top to the rear of the keyboard is the card processing portion of the data recorder.

Included in the card processing portion of the data recorder are primary and secondary card input hoppers 14 and 16 respectively. As will become apparent from a further explanation of the data recorder, the primary and secondary card input hoppers hold blank cards or previously punched cards to be used in any one of the card preparation operations performed by the data recorder. Cards from the primary and secondary card input hoppers 14 and 16 are fed by transport means (not shown) to a card read station shown generally as member 18 and from thence to punch and print areas located within the housing 20. After having been processed, cards emerging from the punch-print area are deposited in any one of a plurality of multi-card output stackers 22. A plurality of selectively setable switches 24 are provided to control the various operations of the data recorder and as such are positioned convenient to the operator. The control function of the switches 24 are supplemented by special keys on the keyboard 12.

The desk top 10 rests on a lower structure comprising a housing 26 and a pair of legs 30 and 32. Within the housing 26 are located the electronics and power supplies for operating the data recorder.

Figure 2:
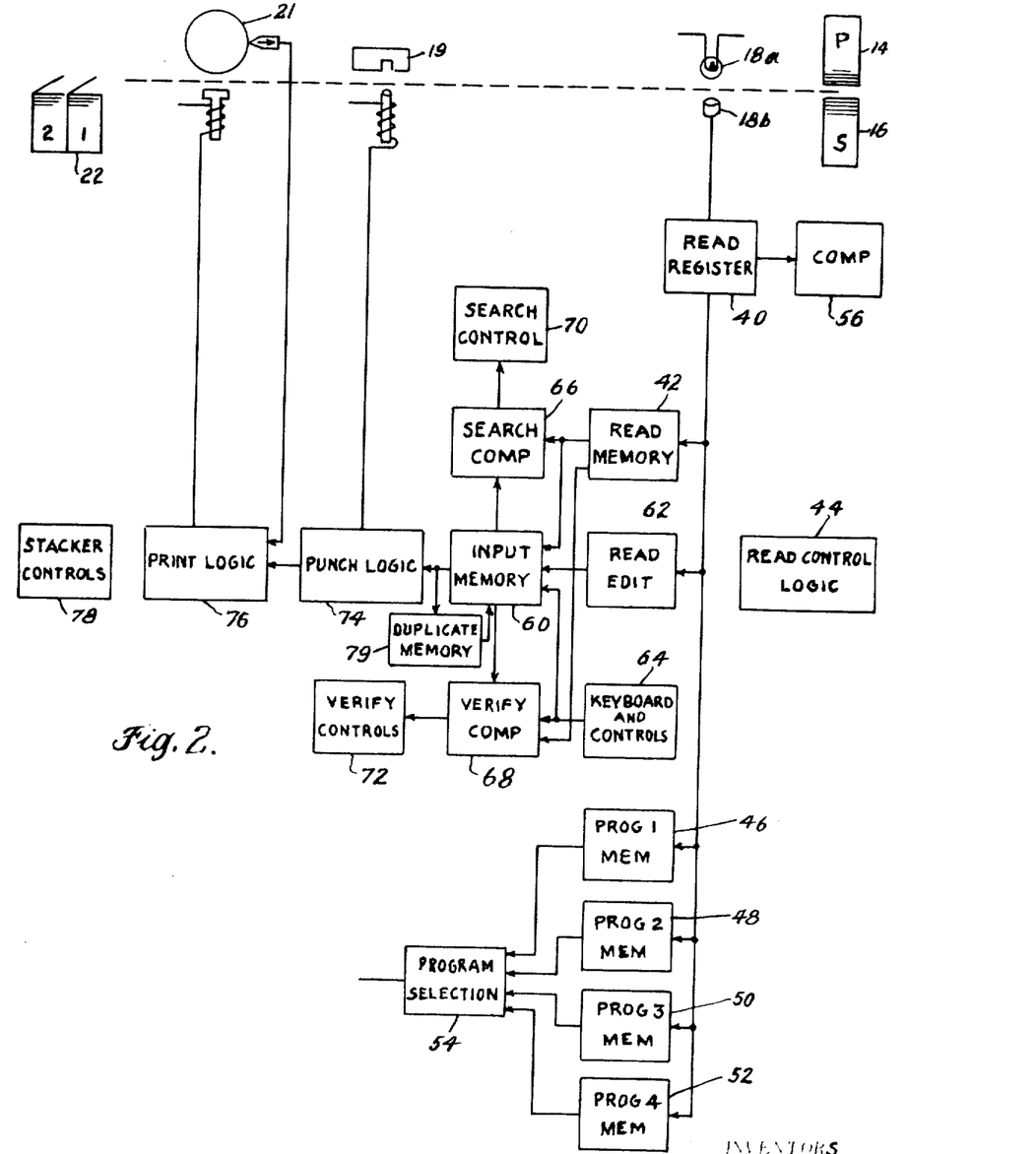
FIG. 2 is a diagrammatical representation of the data preparation device of FIG. 1.

For a better appreciation of the systems organization, giving rise to the novel operating capabilities of the data recorder, reference is made to FIG. 2 which discloses in digrammatic fashion the major components of the data recorder in FIG. 1.

In the upper portion of the drawing of FIG. 2 is depicted a broken line representation of the flow path of punch cards as they travel from right to left through the system. In the upper right hand corner of the drawing are diagrammatically depicted the primary and secondary card input hoppers 14 and 16 respectively. As explained above, punch cards from the primary (or secondary) card input hopper are fed to a read station depicted diagrammatically as comprising a light source 18A and a photoelectric detector 18B. The read station may be implemented by any desired means conventionally used for card sensing purposes.

Continuing with the explanation of flow, the punch cards are transferred via a conventional transport mechanism from the primary and secondary hoppers 14 and 16 through the read area 18, and arrive at a punch station depicted in FIG. 2 as member 19. The punch means may also be of conventional design. From the punch station the cards are transferred to a print station 21 where the indicia entered via the punch 19 is visually recorded by conventional means on the face of the card. From the print station the cards proceed to the output stackers 22 where they are sorted in a conventional manner on the basis of information contained therein, or signals generated in the data recorder.

The lower portion of FIG. 2 diagrammatically depicts the major logic components of the data recorder including the data paths traversed by the information being processed. The data paths have been shown without the interconnecting control circuitry in order to avoid confusion; however, it should be understood that interconnecting circuitry is provided for selectively distributing control signals to gating means associated with each of the components to thereby control the transfer of cards and data within the system. The punch cards used in association with the preferred embodiment of the present invention have 96 card columns divided into three tiers of 32 character columns each. Each character column may be punched to represent one alphanumeric characteric, this representation being effected by a conventional six bit binary code. In the preferred embodiment of the present invention means are provided to simultaneously scan the 18 bits of information comprising a card column.

From the conventional photoelectric card scanning means 18, an electrical signal representation of the information is transferred to a read register 40. The read register 40 serves as a temporary store for the information being scanned and as such serves as an intermediary buffer for information being transferred into a read memory 42. Read memory 42 is capable of storing a binary coded representation corresponding to 96 alphanumeric characters of information i.e. the total contents of a single punched card. The read memory 42 and the read register 40 may both be implemented by conventional means such as magnetic cores or electronic flip flops. In such implementations, conventional set, reset and sensing circuitry will be provided to control and interpret the informational content of the storage devices.

Information is transferred from the read register 40 to the read memory 42 under control of signals generated in the read control logic 44. The read control logic 44 is in turn under the control of signals generated in one of a plurality of stored programs. As represented in FIG. 2, there are 4 programs in the preferred embodiment of the present invention; these being further stored within memories 46 through 52. Selection of programs 1 through 4 is effected by program selection means 54, which in turn may comprise special keys of the keyboard 12.

Control signals generated in the read control logic 44 effect the transfer of information from read register 40 to the read memeory 42. This transfer is also effectively under the control of signals generated in a comparator 56. The comparator 56 functions as a form of mod 2 check on the information being inputted to the read memory 42 from the read station 18 via the read register 40. In this respect, each of the 18 bits of information comprising a column on the punched card being scanned is inputted into the read register 40 twice before being transferred to read memory 42. Upon the initial transfer of the eighteen bits of information to the read register 40, the flip flops or other storage means comprising the read register are set or reset in accordance with the binary value of the information being scanned. The flip flops comprising the eighteen stage read register are of the complimentary type; i.e. each input signal indicative of a binary one is effective in switching the flip flop from one state to the other independent of its preceding state.

As an example, consider that the signal representation comprising the first card column of a punch card being scanned contains the binary representation: 100010 111000 110011. Further, assume that the read register 40 was cleared to an all zero representation just prior to scanning. Thus, after the first scan the eighteen stages of the read register 40 should register the binary representation indicated above. If now the first column of the punch card is rescanned and the informational content thereof-re-entered into the read register 40, because of the complimentary nature of the input means, each binary 1 will cause the corresponding stage of the read register to be recycled to a zero state, assuming a 1 was entered therein in the first scan of the column of information on the punched card. Each binary zero sensed should have no affect on the corresponding stage of the read register 40 during either the first or second scan. Thus, assuming information was correctly transferred to the read register 40 during both the first and second scanning operations, at the conclusion of the latter a zero representation should be registered in all stages of the read register 40. Upon completion of the second scanning operation of each column of information, the comparator 56 is activated to sense whether a binary 1 representation appears in any of the eighteen stages of the read register 40. If a binary 1 is sensed by the comparator 56 an error signal is registered to alert the operator. If no error condition is sensed by the comparator 56, the 18 bits of information, which were transferred to the read memory 42 during the course of the first scanning operation, are cleared and the processing of the next column of information is initiated.

Read memory 42 serves as a buffer for storing the contents of a punch card being scanned preliminary to the transfer of the informational contents thereof to the main operation memory of the system, the latter being identified in the drawing of FIG. 2 as member 60 and referred to hereinafter as the input memory.

Other access paths are provided to the input memory 60 including a path through read-edit control circuitry, represented in FIG. 2 as member 62, and alternatively through the keyboard 12 represented in FIG. 2 as member 64. The function of the keyboard control circuitry 64 will become more apparent from an explanation of the operation of the subject system which follows, and in particular, with respect to an explanation of the key field search and update operation of the present invention. In this respect, the read-edit block 62 serves no function in the key field search and update operation and thus may be ignored for purposes of explanation thereof.

In passing, it should be noted that the read-edit block receives information directly from the card reader via the read register 40. Information is also inputted into the program stores 46 through 52 via the card reader. The program stores contain relatively fixed information for organizing the sequence of operations used in performing the varied operations in the data recorder. Thus, program No. 1 may be a typing program; program No. 2 a read master file program; program No. 3 the search portion of the key search and update operation, and program No. 4 the auto verify operation. Program selection via the program selection means 54 will initiate the transfer of control signals to various ones of the components depicted in FIG. 2.

Information from the main operational memory 60 may be transferred to any one of three areas of the data recorder. Thus, the information may be transferred to the punch-print area 20 of FIG. 1, or to a search comparator 66 for comparison with the data contents of a card in a master file during a key search and update operation; alternatively, the contents of memory 60 may be transferred to another comparator 68 for card verification purposes. Associated with the search comparator 66 and the verify comparator 68 are search and verify control means 70 and 72 respectively.

The data path from memory 60 to the punch-print area 20 of FIG. 1 includes both punch and print logic indicated in the drawing of FIG. 2 as members 74 and 76 respectively. This portion of the data path includes output edit circuitry which functions to format the information in a manner suitable for interpretation by the punch control circuitry. In a similar manner, the information from punch memory is transferred to print memory via print edit circuitry which functions to organize the information in a format suitable for printing. Print control circuitry includes a print comparator and a print counter which are associated with a solenoid actuated print hammer and a sensor for monitoring the relative position of a print roll. The components and operation of the punch-print logic may be of conventional design and need not be elaborated upon here.

After passing through the print station, the cards are selectively deposited in one or another of two stackers 22. Each stacker is capable of accommodating approximately 400 punch cards. Conventional solenoid actuated control circuitry may be used to implement the stacker control.

KEY FIELD SEARCH AND UPDATE OPERATION

Attention is now directed to the key field search and update capability of the present invention. As indicated above, it is this feature which enables a master file to be conveniently updated by scanning all cards for the presence of key information anywhere therein. Upon detection of a card bearing the key, the data recorder transfers portions of the existing card to memory for use in preparing a new card while the operator proceeds to supplement the information in memory designated for incorporation into the new card. All of these steps occur without manual intervention of any kind.

The key search and update operation is initiated by the keypunch operator who sets the controls of the date recorder, by special keys of the keyboard 12 corresponding to the program selection means 54, to engage an appropriate program. In accordance with the example given above, program No. 3 controls the initial portion of the key field search and update operation; however, other of the programs will be used in the execution thereof. Upon selection of program No. 3, signals are directed to various ones of the components of FIG. 2 to condition the system for execution of the key field search and update operation. One such control signal is an enabling signal directed to the keyboard controls 64.

The key to be searched on is entered into the system by the operator via the keyboard 64. Although the search itself may be conducted in any field of the card and the key may comprise any number of characters, means must be provided to assure a comparison of the key with the correct field of information in the card. To accomplish this, a program card comprising a standard punch card and having selectively coded information therein establishing the field boundaries of the cards to be searched is prepared by the operator prior to initiating the key field search and update operation. The program card is read into the appropriate program memory, in this instance program 3 is stored in memory 50, during the introductory phase of the key field search and update operation. The program card is prepared by entering a predetermined code in those columns of the program card corresponding to the field of the master cards to be searched. In the execution of the key field search and update operation, all operations will be automatic insofar as locating the specific field to be searched is concerned.

The keypunch operator next enters an appropriate key to search on by transferring an informational representation thereof through the keyboard 64 for storage in input memory 60. For search purposes the key will be transferred to the search comparator 66, the latter being directed by signals from search control member 70. After the search key has been entered into the input memory 60, the cards comprising the master file are successively scanned, the informational content of each card being transferred into the read memory 42 where it is stored pending a comparison of the designated portion of the card with the search key stored in the input memory 60. Should a favorable comparison occur, a signal is generated informing the operator that a card bearing the search key has been located. At such time, the operator enters supplemental information into the input memory 60. The contents of the input memory 60 will thereafter be transferred to punch logic 74 for entry into a blank card brought into the punch station 19 from the secondary hopper 16.

Figure 3A:
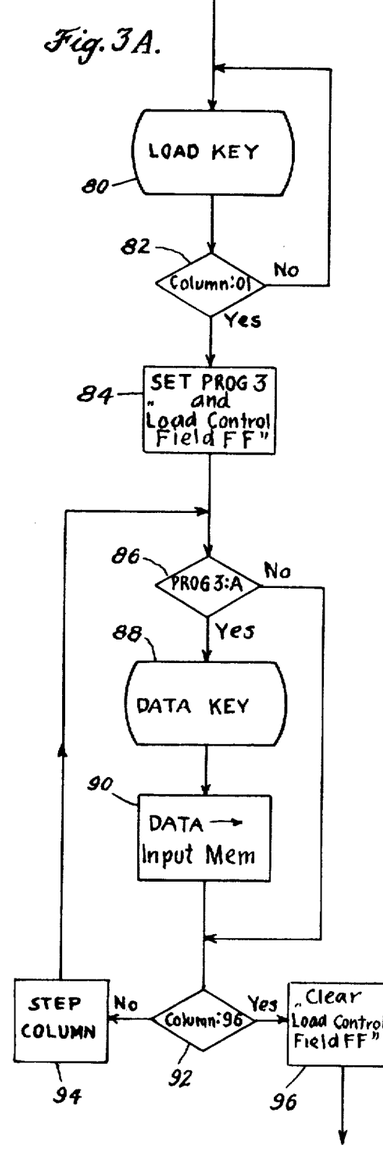
FIGS. 3A, 3B and 3B constitute flow charts depicting the operations involved in the execution of the key search and update operation as performed in the apparatus depicted in FIGS. 1 and 2.

In further explanation of the key field search and update operation, reference is now made to the flow chart of FIG. 3A, which depicts, in a conventional fashion, the operations involved in loading a search key into memory. Thus, the diamond shaped symbols represent decisions executed by the control logic of the data recorder. The regularly shaped rectangles depict operations of the data recorder which are independent of the operator; while the rectangles with curved side portions represent operations involving the operator.

The first step depicted by the combination of rectangle 80 and diamond 82 is to recycle the memory addressing means to assure that column 1 of the 96 column punch card is being addressed. At such time as the above condition obtains, a switch is thrown (84) setting program 3 and a "Load Control Field" flip flop associated with the read control logic 44. This, in effect, sets the data recorder into the load-search-key mode of operation. A first step in the execution of program 3 is to ascertain whether the column contains a particular row punch (86).

As indicated above, each of the 96 columns on the punch car is provided with six possible punch positions, these being further divided into two zone punches and four digit punches. The zone punches are identified as zone A and zone B. The digit punches are assigned the values 8, 4, 2, and 1. Various combination of digit punches yield a decimal representation of numeric characters, while the combination of zone and digit punches provide alphabetic and special characters. Combinations of zone and digit punches are entered into the program card to direct the automatic operation of the data recorder.

If, in the execution of the load-search-key-into-memory phase of the key field search and update operation, a zone A punch is detected, it is interpreted to mean that the unit is ready to accept the first character of the search operand. The operator then enters the search key (88) which is then transferred by the data recorder (90) into the corresponding location in input memory 60. In the preferred embodiment of the present invention, they key consists of a multi-character field or a multiplicity of multiplicity of multi-character fields.

If a zone A punch is not detected in the column being scanned, operational steps represented by sympols 88 and 90 are by-passed by the decision made whether the column just scanned is the last column in the card (92). If the answer is no, the column scanning means are stepped by one column (94) and the sequence of operations is repeated commencing with the determination of whether the column now being scanned contains a zone A punch (86). The scanning of the last column on the cards marks (92) the completion of the load control field into input memory phase of the key field search and update operation. At this point, the "Load Control Field" flip flop (96) is cleared and the next phase of operation is commenced.

Figure 3B:
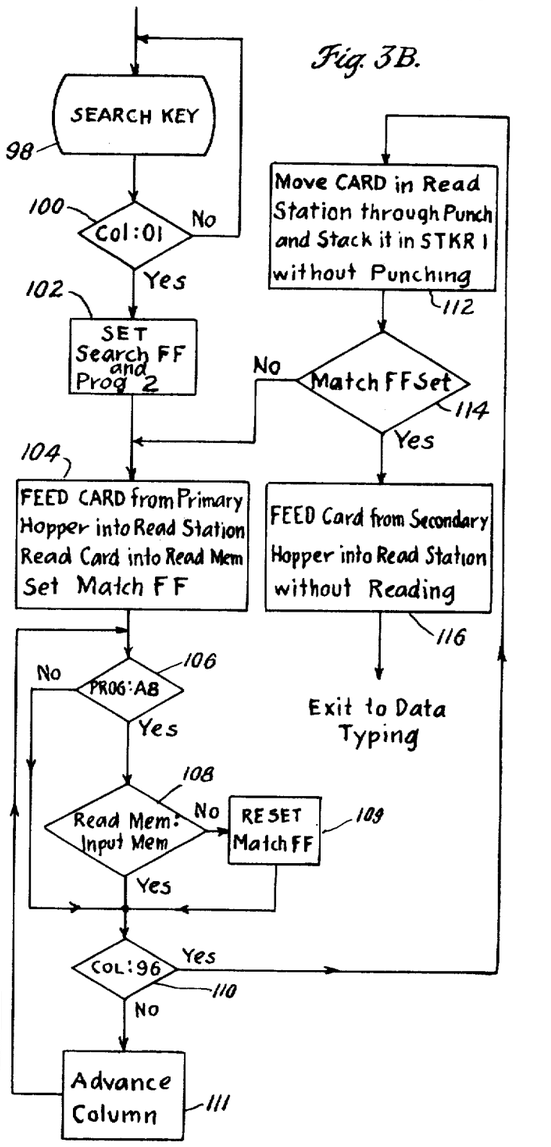

Once the search operand has been entered into input memory (98), a search can proceed. FIG. 3B depicts this phase of the key field search and update operation. The first step (100) in the search operation is to insure that the addressing means for both the input memory and the read memory are set to scan column 1. Means are provided to recycle the addressing means until both column 1 of the input memory 60 and of the read memory 42 are being addressed. Upon proper alignment of the addressing means, a signal is directed to the search control mechanism 70 of FIG. 2 to set the "Search" flip flop, this initiates the search operation (102). At the same time, cycling of program 2, stored in member 48 of FIG. 2, is initiated. Program 2 is the source of control signals for executing the search operation.

At this pont (104), the punch cards comprising the master file to be scanned are located in the primary input hopper 14. The first card is fed therefrom and scanned at the card read station 18 and the contents thereof stored in read memory 42. At the same time, a signal is transferred to the search control mechanism 70 and a "Match" flip flop set in consequence thereof.

The next step (106) is to compare the key located in input memory 60 with the contents of the corresponding locations of the card being scanned. The search is limited to the designated key field by testing whether the contents of the program card for program No. 2 contains a zone A punch, together with a digital 8 punch; this combination designating the key field to be searched. If for all columns of the program card in which an A8 combination is entered, the contents of the read memory 42 and the input memory 60 are found to match (108), a signal is sent (112) to the transport mechanism of the data recorder to move the card currently positioned at the read station 18. through the punch-print area 20 and stack it in output stacker No. 1. Step 110 assures that this signal is delayed until all columns of the card have been searched.

If, in the course of the comparison operation (108) of the designated key field, the contents of read memory 42 do not match the contents of input memory 60, a signal is transferred to clear the "Match" flip flop of search control member 70 (109). Thus, at the completion of the scanning of each of the master cards and just subsequent to the transfer thereof to the output stacker No. 1 (112), a decision is made as to whether the "Match" flip flop had been reset during the course of the comparision operation for that particular card (114). If the "Match" flip flop has been reset, the next card of the master file to be processed is moved into the read area and the search operation is repeated (104).

If the match flip flop is still set at the end of the search operation for a particular card, a blank card is fed from the secondary hopper 16 into the transport mechanism of the data recorder and a branch operation performed whereby the search operation is halted and a program shift effected to enable the preparation of a new card (116).

Figure 3C:
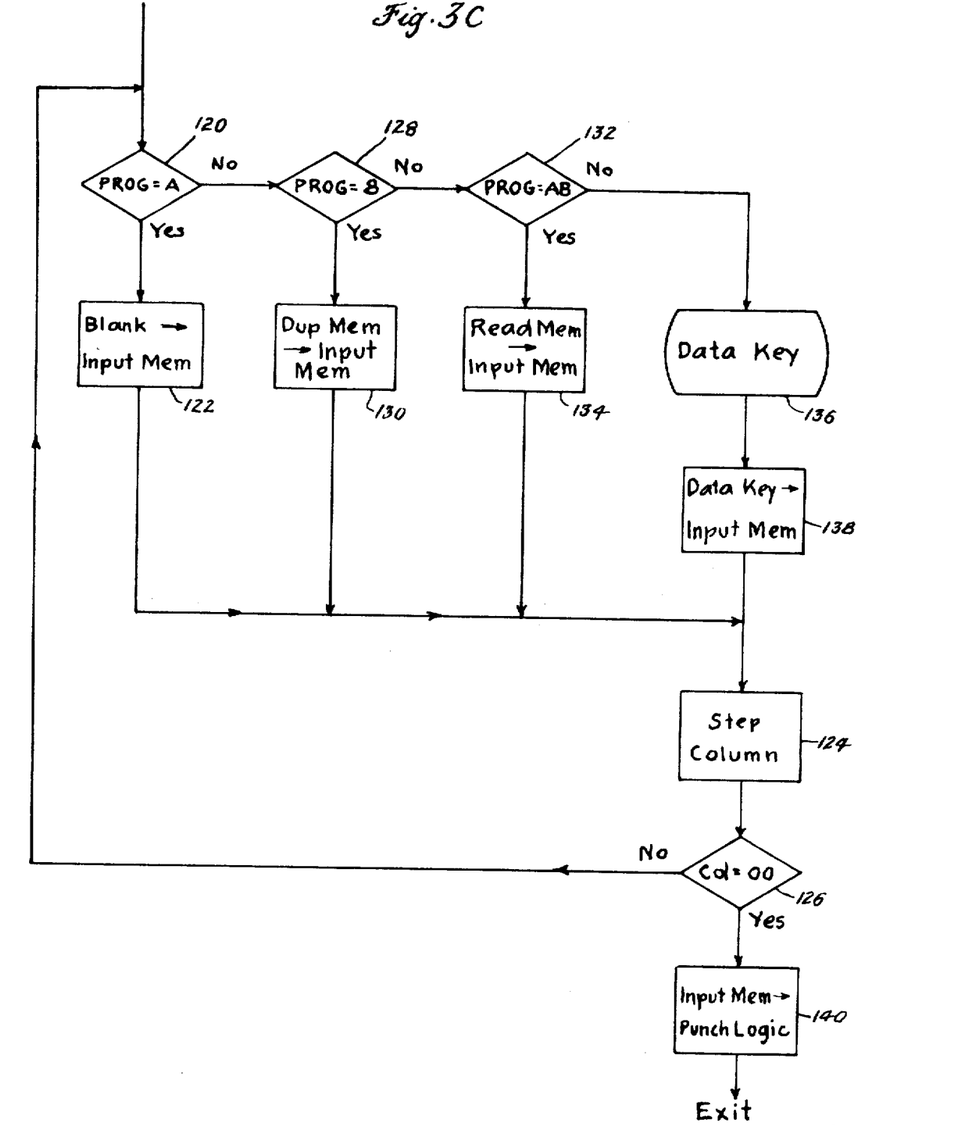

In the preferred embodiment of the present invention, the preparation of a new card proceeds under control of signals generated by program No. 1, as stored in member 46 of FIG. 2. Reference is now made to FIG. 3C, which depicts the operative steps involved in the preparation of a new card.

As indicated above, special code configurations are entered into the program card for each program to control the operation of the data recorder. Three such code configurations are embodied in the program card for program No. 1.

The first such code is a zone A punch. If a zone A punch is deteced (120), a blank is entered into input memory in the corresponding column of the card being prepared (122). Thereafter, the column addressing means is stepped (124) and, assuming the last column on the card has not been reached (126), the cycle is repeated.

If no zone A punch is detected in the program card, a test is made to ascertain whether a digital 8 punch exists in the program card (128). If a digital 8 punch is located in the program card, the information from the corresponding location of the previously processed card is entered into input memory at the corresponding location (128).

It should be noted at this point that the information to be entered into a punch card is first generated and temporarily stored in the input memory 60, whereafter it is transferred to punch logic 74 where it is used in the punch operation. In conventional implementations, the information is readily available for recall to the input memory 60 from the memory portion of the punch logic 74. However, in the preferred embodiment of the present invention, the input memory 60 operates asynchronously with respect to the punch and print logic. This means that the input memory 60 may be out of step with the memory portion of the punch logic 74 and print logic 76, such that information can no longer conveniently be recalled to input memory. The asynchronous operation affords a faster processing speed; however, to enable information from previously prepared cards to be conveniently entered into cards currently being prepared, a duplicate memory 79 is operatively tied in with the input memory 60, such that the informational content of the previously processed card is stored therein and thus readily available upon demand.

Returning now to the typing operation, depicted by the flow chart of FIG. 3C, if no zone A punch or no digital 8 punch is detected in a particular column of the program card, a test (132) is made to ascertain whether the combination of an 8 and an A punch is present therein. If the combination of an 8 and an A punch occur in the program card, the informational content of the corresponding location of the master card being processed, as stored in the read memory 42, is transferred to the input memory 60 (134).

If, for a particular column of the program card, there is no code configuration detected, the unit stops, with the column into which information is to be keyed indicated. The unit is now ready to accept input information, which when entered (136) is transferred (138) to the input memory 60, whereafter the operation (120) is repeated for the next column. Upon completion of the entry of information into the memory (140), the contents of the latter are transferred to the punch logic 74 for inputting into a punch card. After all columns of the card have been processed, operation shifts back to the feedcard portion of the search operation as depicted at 104 of FIG. 3B. Since the preparation of cards is one of the independent functions of the subject data recorder the operative cycles of program 1, as depicted in FIG. 3C, remain essentially unchanged in this mode of operation.

Figure 4:
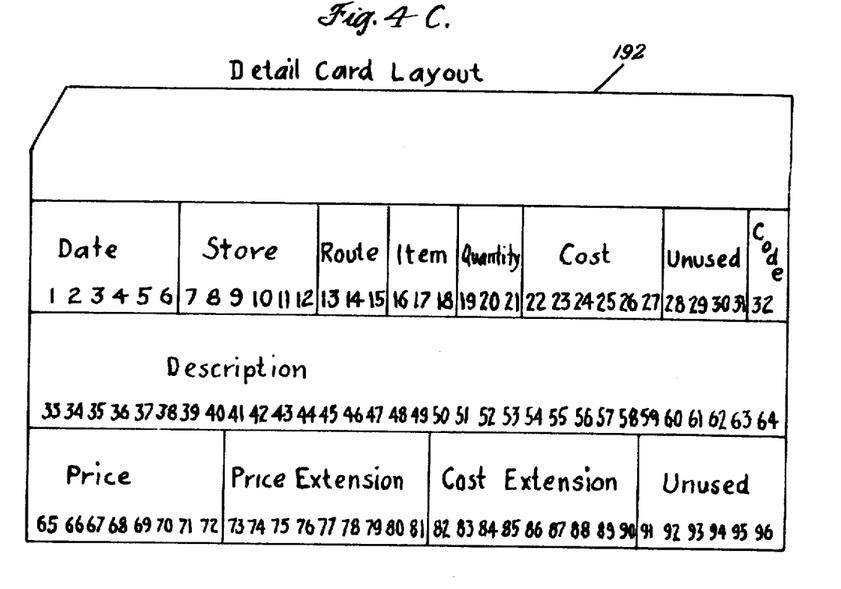
FIGS. 4A, 4B, 4C, 4D and 4E constitute a detailed representation of the forms and operating steps involved in the execution of an ordering routine in the apparatus of FIGS. 1 and 2.
Figure 4A:
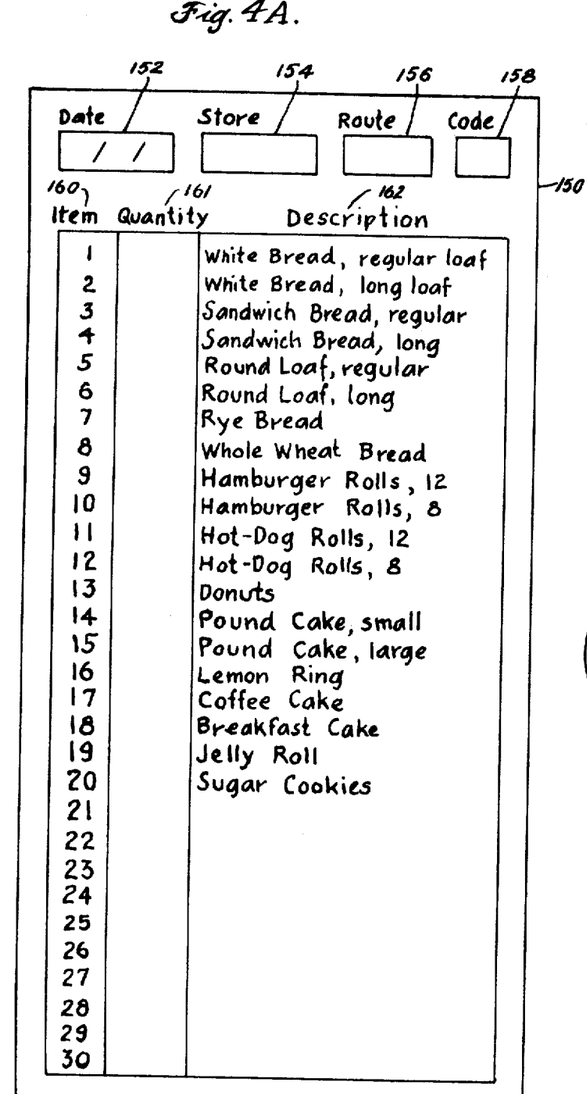

The key field search and update capability, and other features of the subject data recorder are perhaps best illustrated by way of an example involving the data processing of orders received from a number of different commercial enterprises, such as a food processor serving a multiplicity of outlets. Consider a bakery which distributes its products through 100 retail stores. Each of these stores places its order for the following day on preprinted forms such as are shown in FIG. 4A. The date (152), store (154), and route (156) are entered at the top of the form 150. Each item (160) is preassigned an order number which appears aside of the description (162) of the item. The quantity (161) of each item being ordered is entered by the store manager prior to pick up of the form by the route salesman, who collects the order forms when he delivers the previous order. At the end of the day the salesman turns in the order forms collected from all of the stores on his route whereupon they are processed by the keypunch operator. In this respect, all orders are keypunched into cards and processed into various reports such as delivery lists, invoices, order summaries, etc.

In preparing the punch cards, the keypunch operator will initiate a search of a master file, the punch cards of which correspond to each item in inventory. The purpose of the search is to locate the master card pertaining to each item being ordered. Once having located the card, certain information such as the description of the product and the unit cost will be entered automatically into a new card. Additional information, such as the customer and quantity being ordered, will be typed directly into a predetermined field of the new card by the keypunch operator. Additional information, such as the date, will be entered automatically from the preceding card.

Pricing information must also be entered into the new card. Since the orders originate from different outlets, and since a variety of different discount schedules may apply to these outlets, it is important to facilitate the easy entry of this information into the new card. The latter operation is conveniently effected in the subject data recorder by the field select feature. The keypunch operation involved in the processing outlined above is greatly simplified by use of the key field search and update capability and the field select feature as is set out more completely below.

Figure 4B:
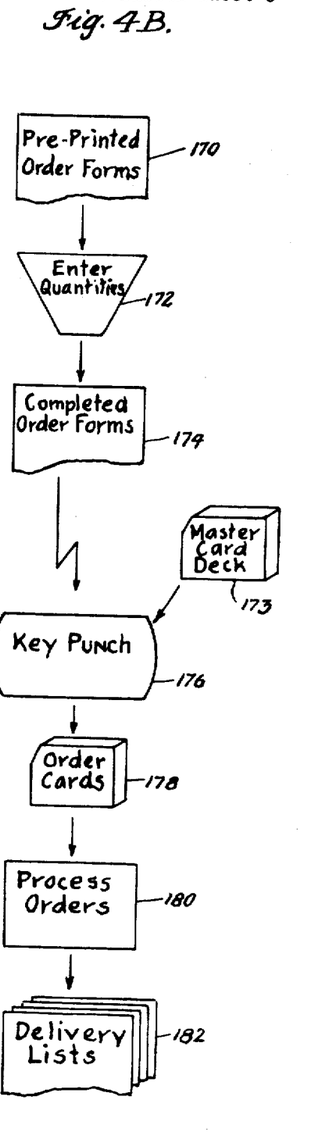

The steps involved in the order processing operation are illustrated generally in FIG. 4B. These include the preparation and distribution of the pre-printed order forms (170) to the various retail outlets served by the bakery. Quantities are entered (172) and the forms picked up and turned into the bakery (174), as outlined above.

For the keypunching operation, a master file (178) is placed in the primary hopper 14, and blank cards in the secondary hopper 16 of the data recorder of FIG. 1. Appropriate programs are loaded into the program storage areas 46, 48, 50 and 52. As in the explanation of the key search and update operation, program 1 controls the detailed typing of data into the newly prepared cards. Program 2 controls the search while program 3 controls the field select feature. The keypunch operation (176) is explained in more detail below; however, once the new order cards (178) have been prepared they may then be used to process the orders (180) and prepare delivery lists (182).

Figure 4D:
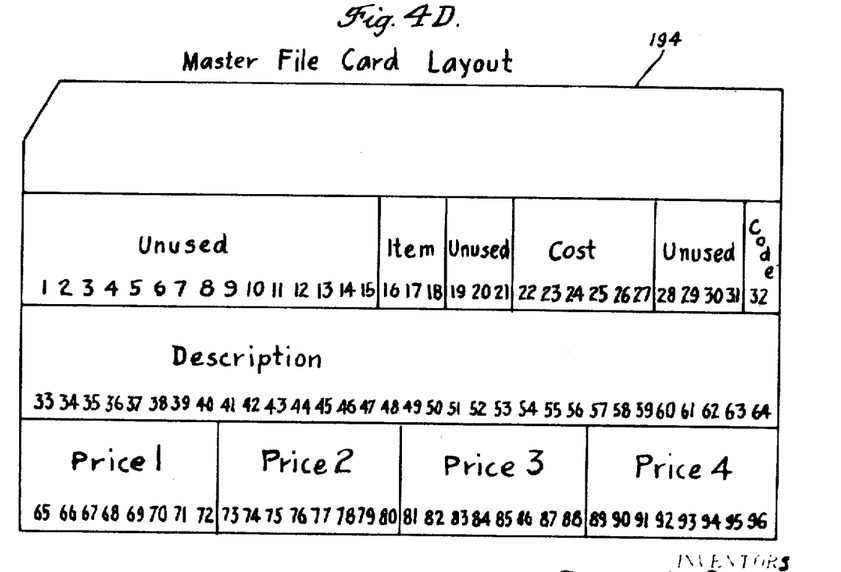

As indicated above, the portions of the operation outlined by the flow chart of FIG. 4B which merit further consideration concerns the keypunch operation (176). In this respect, reference is made to FIG. 4C and D which disclose a detail card layout (192) and a master file card layout (194). As indicated above, the master file card contains information pertinent to each item in inventory. The lowermost tier of information contains pricing information, there being depicted in FIG. 4D four different prices. The field select feature of the subject invention enables the price information located in any one of the four distinct price areas of the master file card to be transferred to a predetermined field in the newly prepared card. Thus, with respect to the master file card of FIG. 4D, price information from any one of the four price areas (delineated therein as encompassing columns 1 through 72; 73 through 80; 81 through 88; and 89 through 96), will be transferred to the price field of the detail card of FIG. 4C (the price field in the latter encompassing columns 65 through 72).

To facilitate the field select operation, the keypunch operator, preliminary to the processing of the order sheets, prepares a program card for each program as outlined above. The program card for program 1 utilizes a digital 8 punch in a column to instruct the data recorder to transfer the information from the corresponding column of the previously punched card into the same location of the card presently being prepared. Similarly, the combination of a digital 8 and a zone A punch entered under a particular column of the program card initiates the transfer of information from the corresponding column of the master card to the card presently being prepared. The program card for the search operation is prepared to enable a comparison to be made in the field of the detail card of FIG. 4C corresponding to the item number; i.e. column locations 16 through 18. In preparing the program card for the select field program, a different numeric or alpha-numeric code is assigned to each of the four price fields of the master card, this code being entered into corresponding locations of the program card.

Before processing the order form for a particular store, the operator fills in the code block (158) of FIG. 4A with information identifying the discount rate which applies to that store. Then, using the order form as a source document, the operator begins preparing the first detail card by keying the date, store number and route number into the data recorder. This information will be duplicated into all cards for the store whose order is currently being processed, this being effected through the digit 8 punch entered in the program card for program 1. The operator then enters the item number in column locations 16 through 18; and thereafter actuates one of the switches 24 of FIG. 1 to initiate the search operation.

In the manner outlined above with respect to the explanation of the key search and update operation, during the search operation the data recorder feeds and reads a master card from the primary hopper 14, and, under the control of a properly prepared program card, compares the contents of column locations 16 through 18 of the master card being scanned with the corresponding locations of the detail card presently stored in input memory 60. If there is no match, another card is fed, read and compared; this continues until a match occurs. At such time as a match occurs, the input memory 60 contains the date, store number, route number and item number corresponding to the order being processed. Similarly, the read memory 42 contains the card image of the master card whose item number corresponds to the number of the item being processed.

The operator can now key in the quantity and make a selection from among selection switches which may be on the keyboard 12 corresponding to the appropriate discount rate for that store, as indicated by the content of the code block 158 on the order form 150 of FIG. 4A. This, in turn, initiates a comparison between a numeric or alphanumeric value assigned to the selected switch 24 and the same value entered in the field locations on the program card corresponding to one of the four price areas of the master card. When a favorable comparison is effected, an output signal from the comparator is transferred to interpretive positioning means associated with the master card. Pricing information from the indicated one of the four price areas of the master card is transferred into the price information field of the card being prepared.

Figure 4E:
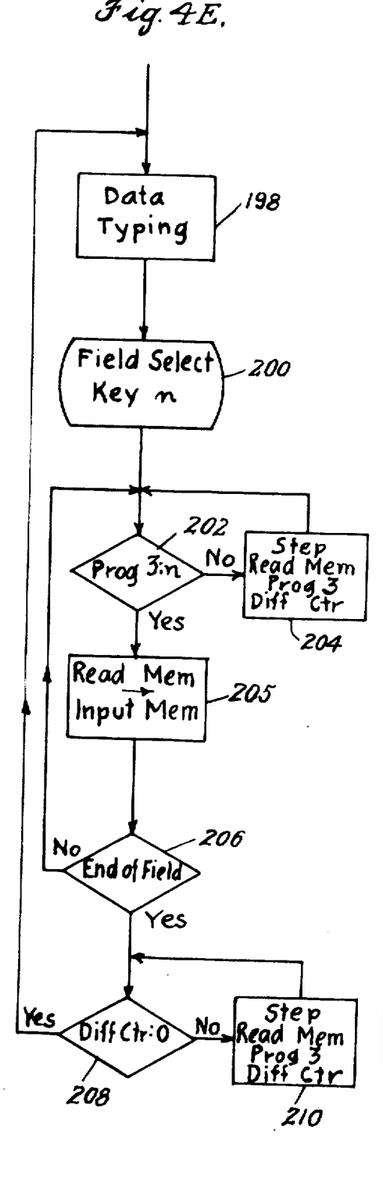

The field select phase of operation should be more clearly understood from an examination of FIG. 4E, which depicts the steps involved in the execution thereof. The date, store number, route number, item number and quantity for the card being prepared is first inputted into input memory (198); whereafter the operator (200) selects an appropriate one of the keys of the switchboard 12 to initiate the transfer of the correct price information from the master card of FIG. 4D to the price field of the detail card of FIG. 4C. Upon selection of such means by the keypunch operator, Program 3 is actuated (202) and in the manner indicated above a determination is made as to whether the information in the column of the program card presently being scanned corresponds to the price schedule of the store whose order is being processed. If not, the addressing means for the read memory 42, the addressing means for the Program 3 memory and a difference counter (not shown) are stepped (204) until such time as the informational content of the column of the program card being scanned compares to the code corresponding to the discount schedule of the store whose order is being processed. At such time (205), the contents of the read memory are transferred to the input memory.

It will be noted that during the stepping operation, the addressing means of the input memory remained fixed while the addressing means of the read memory was stepped along with that of the program card and the difference counter. Thus, when a favorable comparison is effected, the information transferred from read memory to input memory constitutes the discount price applicable to the store whose order is being processed. The information transfer continues until an end of field designator is sensed (206), at which time the transfer of information from the auxiliary memory to the input memory ceases.

The field select operation enables information from the master card, as stored in the read memory, to be transferred into a different portion of the input memory. Accordingly, at the completion of the field selected operation, steps must be taken to realign the auxiliary memory, the input memory and the program 3 memory. These means include the difference counter referred to in the explanation of the stepping operation (204).

At this point, a decision (208) is made as to whether the difference counter registers zero. If not, the read memory, the program memory and the difference counter are all stepped negatively by one increment (210) and operation 208 repeated. When the difference counter registers zero, the respective memories are realigned and the fiield select operation is complete.

Other information such as the code, description and unit cost is automatically transferred from the card image of the master card, as stored in read memory 42, and stored in the input memory for subsequent transfer to the punch logic 74. The detail card is thereafter punched at the punch station 19, while the number of the second item being ordered is loaded into the appropriate field positions of the input memory 60 and a new search is initiated. After all items of an order have been processed, a new store number and route number are keyed into the data recorder as above to initiate the porcessing of a second order. This operation proceeds for all the orders for the day, whereafter the cards are verified and processed.

AUTO VERIFY OPERATION

Verification is an operation conventionally performed in the preparation of punch cards. In the verify operation, the accuracy of the information recorded in the cards is checked. It is also conventional to implement data preparation devices such that only the information actually keyed into the card by the keypunch operator need be verified. Thus, in the case of the bakery ordering example given above, the date, store number, route number, item number, quantity and the code within the price field is all that need be verified. Means for automatically verifying information entered into the card by the data preparation device are known.

The advantage of the present system is that it has the capability of automatically performing the card handling functions of the verify operation. Thus, should an error be detected in the informational content of a card being verified, a blank card from the secondary hopper 16 will be automatically positioned at the punch station to receive a corrected version of the informational content of the card found to be in error. This operation will proceed without necessitating manual intervention on the part of the keypunch operator.

Figure 5:
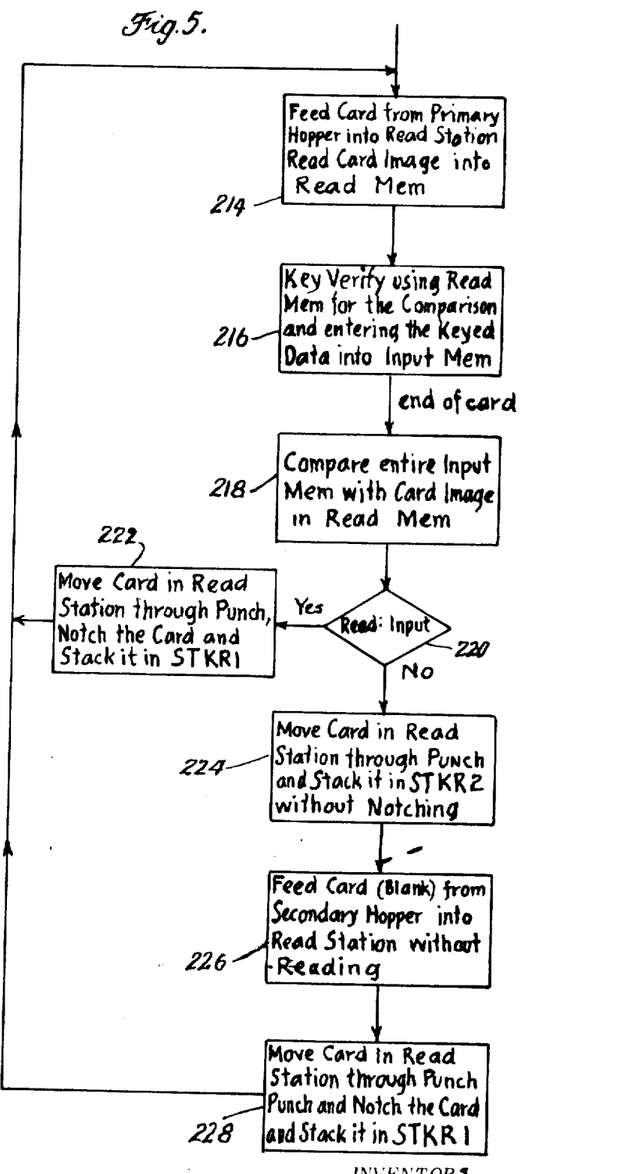
FIG. 5 constitutes a flow chart depicting the operations involved in the execution of the auto-verify operation in the apparatus of FIGS. 1 and 2.

Reference is now made to FIG. 5, which depicts the operative steps of the apparatus of FIGS. 1 and 2 in executing the auto verify operation. Before initiating the verify operation, the operator positions the previously prepared cards in the primary hopper 14. These are next transferred (214) by the transport mechanism of the data recorder to the read station 18, whereafter a card image thereof is registered in the read memory 40. The next step (216) in the verify operation is for the kepunch operator to key information from the original source document into input memory 60 via the keyboard and controls 64. By means including the verify control 72, a comparison (218) of the entire contents of the input memory 60 with the information contents of the read memory 42, is effected in the verify comparator 68. At this point, a decision (220) is made as to whether the contents of the auxiliary memory equals the contents of the input memory. If the answer is yes, the card presently at the read station is moved (222) to the punch area 19 where the card is notched before being passed through to the output stacker for stacking in output stacker 1.

If the results of the comparison of the auxiliary memory and input memory is unfavorable, the card being verified is moved (224) through the punch area without notching and is stored in output stacker No. 2. In such cases, a blank card is fed (226) from the secondary hopper 16 and a corrected version of the information is automatically entered therein from memory, whereafter the card is notched (228) and stacked in output stacker 1.

From the above, it can be appreciated that the various operations involved in the preparation of a punch card are conveniently facilitated by the design features and operational capabilities of the subject data recorder. It should be further appreciated that, whereas, the preferred embodiment of the present invention includes a number of these novel features and operational capabilities, these same design features and operating capabilities may have independent significance. Accordingly, it should be understood that the invention is not limited to the specific combination of design features and operating capabilities shown, but that the features can be rearranged without departing from the spirit and scope of the invention.

We claim:

1. A card preparation device for inputting information into punch cards without necessitating manual intervention in the operation thereof, comprising plural input hoppers for holding pre-punched and blank cards, card scanning means operatively connected to said plural input hoppers, said card scanning means being adapted to receive a pre-punched card from one of said plural input hoppers and for scanning the informational content thereof, storage means connected to said scanning means, said storage means being operative upon the detection of a predetermined bit configuration in the informational content of the card being scanned to store the informational content of said pre-punched card, keyboard input means operatively connected to said storage means for supplementing the information entered therein from said pre-punched card, control means interconnected with various other means comprising said card preparation device, said control means adapted to control the transfer of information within said card preparation device, card punch means including a punch station operatively connected to said storage means, means including said control means for transferring a blank card from one of said plural input hoppers to said punch station, said control means being further effective to transfer the selectively stored contents of said pre-punched card and said supplemental information entered into said storage means via said keyboard from said storage means to said punch means and to effect the punching of said blank card in accordance therewith, and means including plural output stackers operative to selectively stack the newly punched card and the pre-punched card in particular ones of said plural output stackers.

2. Apparatus for inputting information into punch cards, comprising plural input hoppers and output stackers for holding pre-punched and blank cards to be fed to said card preparation apparatus, means for sensing the informational content of one of said pre-punched cards, storage means for storing selective portions of the informational content of said pre-punched card, means connected to said storage means for supplementing the informational content stored therein, control means for effecting the transfer of said pre-punched and blank cards and said information within said apparatus, punch means for entering information into one of said blank cards, and means including said control means for effecting the transfer of the informational contents of said storage means to said punch means, and for punching said information into said blank card and means operative to transfer the newly punched card and the pre-punched card to said plurality of output stackers and for stacking said cards therein.

3. In a punch card preparation device adapted to sequentially search a plurality of pre-punched cards and upon locating a card bearing predetermined information to effect a transfer of portions of the informational contents thereof to a punch station for entry into a blank card, comprising: means for storing a variable length search operand, means for comparing said search operand with the informational content of each of said pre-punched cards, means operative upon a favorable comparison to effect the automatic transfer of portions of the informational content of that card to said punch station for entry into a blank card, and means to supplement the information being transferred to said punch station prior to the entry thereof into said blank card.

4. A card preparation device comprising, card transfer means including means for holding a plurality of pre-punched cards and a plurality of blank cards, means for successively scanning said plurality of pre-punched cards, means for temporarily storing the informational contents of each such pre-punched card being scanned, means for entering a search operand into said card preparation device, comparison means for comparing said search operand with the informational contents of said temporary storage means, means comprising a punch station and means operative upon a favorable comparison to transfer selective portions of the informational content of said temporary storage means to said punch station for entry into one of said blank cards.

5. A punch card preparation device comprising first and second card input hoppers for holding both pre-punched and blank cards respectively, a read station for successively scanning each of said pre-punched cards, a punch station including means for entering information into said blank cards, first storage means for temporarily storing the informational content of one of said pre-punched cards as it is scanned at said read station, second storage means, means for inputting a search operand into said second storage means, a comparator, and control means for effecting a comparison of the search operand stored in said second storage means with the informational content of said pre-punched card as stored in said first storage means and operative upon a favorable comparison thereof by said comparator to effect the transfer of selective portions of the informational contents of said first storage means to said punch station for entry into a blank card.

6. A card preparation device comprising plural hoppers for holding a plurality of pre-punched and blank cards, means for scanning a pre-punched card and for transferring the informational contents thereof to said card storage means, means for entering a variable length seach operand into said card preparation device, means including a comparator for comparing said search operand with the informational contents of said card storage means, punch means including a punch station, and means operative upon a favorable comparison within said comparator to transfer selective portions of the informational content of said card storage means to said punch station for entry into one of said blank cards.

7. In a data preparation device adapted to transfer information from any one of a plurality of fields of a pre-punched card into a different field of a card being prepared, the combination comprising plural storage means comprising first storage means for storing the informational content of a pre-punched card, second storage means for storing a plurality of different codes each of which corresponds to a different one of the plural fields within the card stored in said first storage means from whence information is to be transferred, selection means for selecting the code corresponding to the field from whence information is to be transferred, means for addressing said plural storage means, third storage means and means to step addressing means associated with said first and second storage means until said selected code is detected in said second storage means and for effecting the transfer of the informational contents of corresponding locations of said first storage means to a predetermined field of said third storage means for entry into corresponding locations of a new card being prepared.

8. A punch card preparation device comprising plural card input hoppers for storing a plurality of prepunched and blank cards respectively, plural card output stackers for receiving and stacking cards processed through said punch card preparation device, each of said pre-punched and blank cards comprising plural fields for storing coded information therein, program control means for controlling the transfer of the informational content of any one of a plurality of fields of a pre-punched card to a predetermined field of a card being prepared, said last named means comprising first and second storage means, said first storage means storing a plurality of different codes each of which distinguishes a different one of the plural fields within a card from whench information is to be transferred, selection means for selecting the code corresponding to a particular field from whence information is to be transferred, comparison means for comparing the selected code with the plural codes stored in said first storage means and upon the occurrence of a favorable comparison within said comparison means for effecting the transfer of the informational content of the corresponding field locations in the card containing the information to be transferred to said second storage means for entry into a predetermined field of said card being prepared.

9. An apparatus for verifying the informational content of newly punched cards, comprising plural input hoppers for holding a plurality of pre-punched and blank cards, means for scanning one of said pre-punched cards and for temporarily storing a representation of the informational content thereof, means for keying into said apparatus the information from the source document used in the preparation of the card being verified, means for comparing the newly keyed information with the representation of the informational content of the card being verified which representation is stored in said temporary storage means, means operative in the event an unfavorable comparison is registered in said comparison means to enable corrections to be effectively made to the informational content of said temporary storage means, and means further operative in the event an unfavorable comparison is registered in said comparison means to insert into said apparatus a blank card from one of said plural input hoppers and to enter into said blank card a corrected version of the information stored in said temporary storage means and to simultaneously eject from said apparatus the pre-punched card which triggered the unfavorable comparison.

References Cited

UNITED STATES PATENTS

| | | | |
|---|---|---|---|
| 3,351,912 | 11/1967 | Collom et al. | 340—172.5 |
| 3,411,141 | 11/1968 | Bernier et al. | 340—172.5 |
| 2,944,733 | 7/1960 | Austin | 235—61.6 |
| 3,066,280 | 11/1962 | Perry | 340—172.5 |
| 3,544,967 | 12/1970 | Sallach et al. | 340—172.5 |
| 3,360,781 | 12/1967 | Boehnke | 340—172.5 |
| 3,145,920 | 8/1964 | Berlinsky et al. | 234—55 |
| 3,069,659 | 12/1962 | Skovmand et al. | 340—172.5 |
| 2,923,924 | 2/1960 | Papo | 340—174 |
| 2,929,556 | 3/1960 | Hawkins et al. | 235—155 |
| 2,892,182 | 6/1959 | Neff | 340—173 |

PAUL J. HENON, Primary Examiner

J. E. RHOADS, Assistant Examiner

UNITED STATES PATENT OFFICE
CERTIFICATE OF CORRECTION

Patent No. 3,706,074　　　　　　　　Dated December 12, 1972

Inventor(s) Frank H. McPherson, Irvin S. Lownes, Jr., Thomas L. Richardson

It is certified that error appears in the above-identified patent and that said Letters Patent are hereby corrected as shown below:

Col. 3, line 11, "3B" (second occurrence) should read -- 3C --;

Col. 3, line 27, "embodiments" should read -- embodiment --;

Col. 4, line 27, "characteric" should read -- character --;

Col. 5, line 12, delete hyphen (-) after -- thereof --;

Col. 5, line 38, "operation" should read -- operational --;

Col. 7, line 54, "they" should read -- the --;

Col. 7, line 58, "sympols" should read -- symbols --;

Col. 7, line 59, "by" should read -- and --;

Col. 12, line 27, "fiield" should read -- field --;

Col. 14, line 61, "seach" should read -- search --;

Col. 15, line 28, "whench" should read -- whence --.

Signed and sealed this 9th day of July 1974.

(SEAL)
Attest:

McCOY M. GIBSON, JR.　　　　　　　C. MARSHALL DANN
Attesting Officer　　　　　　　　　Commissioner of Patents